United States Patent
Lee et al.

(10) Patent No.: US 9,954,376 B2
(45) Date of Patent: Apr. 24, 2018

(54) METHOD AND APPARATUS FOR CONTROLLING WIRELESS POWER TRANSMISSION

(71) Applicant: Samsung Electronics Co., Ltd., Gyeonggi-do (KR)

(72) Inventors: Woo-Ram Lee, Gyeonggi-do (KR); Joon-Il Kim, Seoul (KR); Sung-Bum Park, Gyeonggi-do (KR); Young-Min Lee, Gyeonggi-do (KR); Hong-Kweun Kim, Gyeonggi-do (KR); Se-Ho Park, Gyeonggi-do (KR); Seung-Woo Han, Seoul (KR)

(73) Assignee: Samsung Electronics Co., Ltd. (KR)

(*) Notice: Subject to any disclaimer, the term of this patent is extended or adjusted under 35 U.S.C. 154(b) by 260 days.

(21) Appl. No.: 14/886,837

(22) Filed: Oct. 19, 2015

(65) Prior Publication Data

US 2016/0043573 A1 Feb. 11, 2016

Related U.S. Application Data

(63) Continuation of application No. 13/474,330, filed on May 17, 2012, now Pat. No. 9,166,446.

(30) Foreign Application Priority Data

May 17, 2011 (KR) .......................... 10-2011-0046379
Mar. 13, 2012 (KR) .......................... 10-2012-0025608

(51) Int. Cl.
*H01F 27/42* (2006.01)
*H02J 5/00* (2016.01)
*H02J 17/00* (2006.01)

(52) U.S. Cl.
CPC .............. *H02J 5/005* (2013.01); *H02J 17/00* (2013.01)

(58) Field of Classification Search
CPC ................................. H02J 5/005; H02J 17/00
USPC ......................................................... 307/104
See application file for complete search history.

(56) References Cited

U.S. PATENT DOCUMENTS

| | | | | |
|---|---|---|---|---|
| 7,925,227 | B2 | 4/2011 | Ichitsubo | |
| 8,577,479 | B2* | 11/2013 | Wakamatsu | H02J 5/005 307/32 |
| 8,600,316 | B2* | 12/2013 | Lum | H04B 1/006 455/550.1 |
| 9,543,777 | B2* | 1/2017 | Nakano | H02J 7/025 |
| 2011/0175455 | A1* | 7/2011 | Hashiguchi | H02J 17/00 307/104 |

(Continued)

*Primary Examiner* — Jared Fureman
*Assistant Examiner* — Duc M Pham
(74) *Attorney, Agent, or Firm* — The Farrell Law Firm, P.C.

(57) ABSTRACT

A wireless power transmission controlling apparatus and method are provided. The apparatus includes a communication unit; and a controller configured to compute an amount of transmission power to be transmitted, based on information received from a wireless power receiving apparatus; output a wireless power transmission control signal corresponding to the computed amount of transmission power; filter the wireless power transmission control signal and pass a harmonic wave corresponding to a predetermined communication frequency band; and control the communication unit to transmit the wireless power transmission control signal based on the harmonic wave.

12 Claims, 3 Drawing Sheets

(56) References Cited

U.S. PATENT DOCUMENTS

| | | | | |
|---|---|---|---|---|
| 2011/0225073 A1* | 9/2011 | Won | ............. | G06Q 30/06 705/30 |
| 2011/0266881 A1* | 11/2011 | Kim | ............. | H02J 5/005 307/104 |
| 2012/0001493 A1* | 1/2012 | Kudo | ............. | H02J 5/005 307/104 |
| 2012/0009869 A1* | 1/2012 | Suzuki | ............. | H04B 5/0037 455/41.1 |
| 2012/0248891 A1* | 10/2012 | Drennen | ............. | H02J 5/005 307/104 |
| 2013/0002191 A1* | 1/2013 | Jung | ............. | H02J 7/025 320/103 |

* cited by examiner

METHOD AND APPARATUS FOR CONTROLLING WIRELESS POWER TRANSMISSION

PRIORITY

This application is a Continuation of U.S. patent application Ser. No. 13/474,330, which was filed in the U.S. Patent and Trademark Office on May 17, 2012, and claims priority under 35 U.S.C. § 119(a) to Korean Patent Application Serial Nos. 10-2011-0046379 and 10-2012-0025608, which were filed in the Korean Industrial Property Office on May 17, 2011 and Mar. 13, 2012, respectively, the content of each of which is incorporated herein by reference.

BACKGROUND OF THE INVENTION

1. Field of the Invention

The present invention relates generally to a method and apparatus for controlling wireless power transmission, and more particularly, to a method and apparatus for controlling wireless power transmission through a wireless communication channel.

2. Description of the Related Art

Wireless power transmission refers to a technology that transfers electric energy through an electromagnetic wave, electromagnetic induction, or electromagnetic resonance, and therefore, provides power without a physical power line. Wireless power transmission will likely be a key technology for charging electronic devices, supplying power to and/or charging of electric vehicles, supplying power to remote areas, supplying power to ubiquitous wireless sensors, etc. Therefore, it is possible that wireless power transmission draw attention as a substitute for conventional scheme power supply using a physical power line.

For example, when wireless power transmission is used in a wireless charging system, the wireless charging system includes a wireless power supplying apparatus that supplies power and a wireless power receiving apparatus that receives power and charges a battery with the received power. The wireless power supplying apparatus measures a change in a load or a change in a resonant frequency in a wireless power transmission idle state, thereby detecting whether an object has been placed on a source resonance unit. When the object is detected, the power supplying apparatus transmits power to the object, and determines whether the object corresponds to an object requiring wireless charging, through an authentication procedure, such as exchanging an IDentifier (ID).

When authentication is successfully completed and the wireless power supplying apparatus determines that the object placed on the source resonance unit is an apparatus that may be wirelessly charged and then negotiates power transmission with the wireless power receiving apparatus.

When the negotiation is completed, the wireless power supplying apparatus starts wireless power supplying for charging the wireless power receiving apparatus, determines whether the wireless power receiving apparatus is fully charged, and stops transmitting power to the wireless power receiving apparatus when the wireless power receiving apparatus is fully charged.

In the wireless charging system as described above, the wireless power supplying apparatus performs wireless power transmission controlling through communication with the wireless power receiving apparatus. For example, a communication scheme between the wireless power supplying apparatus and the wireless power receiving apparatus may be an in-band communication scheme or an out-of-band communication scheme. The in-band communication scheme uses the same frequency band for a power supplying frequency band and a communication frequency band between the wireless power supplying apparatus and the wireless power receiving apparatus when wireless power transmission controlling is performed. The out-of-band communication scheme uses different frequency bands for the power supplying frequency and the communication frequency band between the wireless power supplying apparatus and the wireless power receiving apparatus when wireless power transmission controlling is performed.

In the in-band communication scheme, where the power supplying frequency band and the communication frequency band are the same, limitations on the strength of the power supplying frequency band and that of the communication frequency band may be different from each other.

For example, the Federal Communication Commission (FCC) standard limits a signal strength of a power supplying frequency band to 42 dBmA/m or less, and requires a signal strength of the communication frequency band to be 15 dBmA/m when a frequency band of 6.78 MHz is used for the power supplying frequency band and the communication frequency band. Accordingly, when the signal strength of the power supplying frequency band is greater than or equal to a predetermined level in the in-band communication scheme, the in-band communication scheme may fail to satisfy the FCC standard, and thus, may become inappropriate for communication for wireless power transmission controlling. Also, the in-band communication scheme may have a technical difficulty in performing bidirectional communication. Therefore, the out-of-band communication scheme may be utilized, which is not affected by the limitation on a power supplying signal strength and a communication signal strength because the power supplying frequency band and the communication frequency band are different from each other, and that relatively freely performs bidirectional communication.

FIG. 1 illustrates a conventional wireless power transmission controlling apparatus for a conventional out-of-band communication scheme.

Referring to FIG. 1, the wireless power transmission controlling apparatus includes a power unit 12, a power amplifier 14, a controller 16, a low pass filter 18, a resonance unit 20, an oscillator 22, a communication unit 24, and an antenna (ANT). The wireless power transmission controlling apparatus uses different frequencies for a resonant frequency output from the resonance unit 20, and for a communication frequency used by the communication unit 24. The oscillator 22 generates a frequency for communication. The wireless power transmission controlling apparatus performs various communication for providing wireless power through the frequency generated by the oscillator 22.

Accordingly, the conventional wireless power transmission controlling apparatus creates some problems for manufacturing and size efficiency in that it requires a separate circuit for generating a communication frequency that is different from a power supplying frequency, e.g., the oscillator 22, when the apparatus uses the out-of-band communication scheme.

SUMMARY OF THE INVENTION

The present invention is designed to solve the above-mentioned problems occurring in the prior art, and to provide at least the advantages described below.

Accordingly, an aspect of the present invention is to provide a wireless power transmission controlling method and apparatus that does not require a separate circuit for generating a communication frequency, when a power supplying frequency band and a communication frequency band are different from each other.

Another aspect of the present invention is to provide a wireless power transmission controlling method and apparatus, which does not require a separate circuit for generating a communication frequency, by utilizing a harmonic wave generated from a power supplying signal as a communication frequency for controlling power transmission, when different frequencies are used for a power supplying frequency band and a communication frequency band between a power supplying apparatus and a power receiving apparatus.

In accordance with an aspect of the present invention, apparatus for controlling wireless power transmission is provided. The apparatus includes a communication unit; and a controller configured to compute an amount of transmission power to be transmitted, based on information received from a wireless power receiving apparatus; output a wireless power transmission control signal corresponding to the computed amount of transmission power; filter the wireless power transmission control signal and pass a harmonic wave corresponding to a predetermined communication frequency band; and control the communication unit to transmit the wireless power transmission control signal based on the harmonic wave.

In accordance with another aspect of the present invention, a method of controlling wireless power transmission by a power supplying apparatus is provided. The method includes computing an amount of transmission power to be transmitted, based on information received from a wireless power receiving apparatus; outputting a wireless power transmission control signal corresponding to the computed amount of transmission power; filtering the wireless power transmission control signal and passing a harmonic wave corresponding to a predetermined communication frequency band; and transmitting the wireless power transmission control signal based on the harmonic wave.

BRIEF DESCRIPTION OF THE DRAWINGS

The above and other aspects, features, and advantages of the present invention will be more apparent from the following detailed description taken in conjunction with the accompanying drawings, in which.

Figure 1:
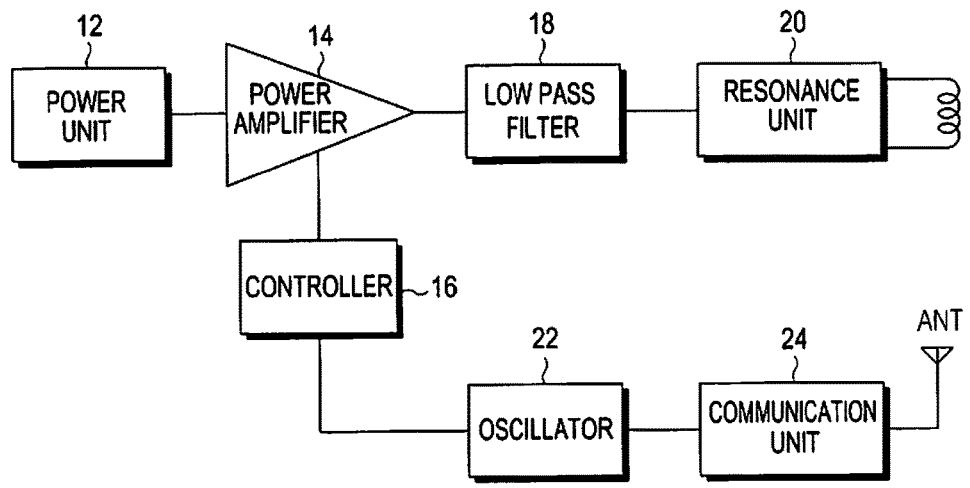
FIG. 1 is a block diagram illustrating a conventional wireless power transmission controlling apparatus.

DETAILED DESCRIPTION OF EMBODIMENTS
OF THE PRESENT INVENTION

Hereinafter, various embodiments of the present invention will be described with reference to the accompanying drawings. In the following description, the same elements will be designated by the same reference numerals although they are shown in different drawings. Further, various specific definitions found in the following description, such as specific values of packet identifications, contents of displayed information, etc., are provided only to help general understanding of the present invention, and it is apparent to those skilled in the art that the present invention can be implemented without such definitions. Further, in the following description of the present invention, a detailed description of known functions and configurations incorporated herein will be omitted to avoid obscuring the subject matter of the present invention.

In accordance with an embodiment of the present invention, a wireless power transmission controlling method and apparatus are provided, which may use a frequency band that is different from a wireless power transmission frequency, for a communication frequency between a power transmitting apparatus and a power receiving apparatus in a wireless power transmission system, and may perform communication for controlling wireless power transmission using a harmonic wave of a wireless power transmission signal.

In particular, different embodiments of the present invention will be described below, which use a band of 6.78 MHz as a power transmission frequency, use a band of 13.56 MHz as a communication frequency band, and use a Near Field Communication (NFC) scheme as a communication scheme. However, other frequency bands may be used. Additionally, the present invention is not limited to an NFC scheme, and other short-distance communication schemes may be used, such as Zigbee communication, Bluetooth communication, an infrared light communication, etc.

Further, the wireless power transmission controlling apparatus may be applicable to wireless charging of electronic devices, wireless power supplying and charging of electric vehicles, wireless power supplying to a remote place, power supplying to a ubiquitous wireless sensor, etc., and may applicable to any device that performs wireless power transmission.

Figure 2:
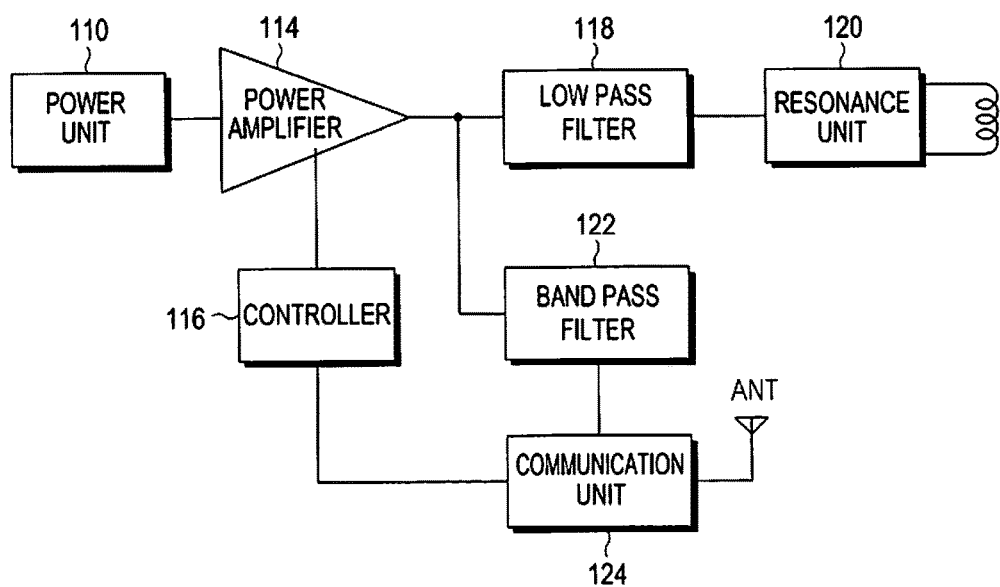
FIG. 2 is a block diagram illustrating a wireless power transmission controlling apparatus according to an embodiment of the present invention.

FIG. 2 is a block diagram illustrating a wireless power transmission controlling apparatus according to an embodiment of the present invention.

Referring to FIG. 2, the wireless power transmission controlling apparatus includes a power unit 110, a power amplifier 114, a controller 116, a low pass filter 118, a resonance unit 120, a band pass filter 122, a communication unit 124, and an antenna (ANT). The power unit 110 supplies a source power. The power amplifier 114 receives the source power supplied from the power unit 110, amplifies the source power based on a control by the controller 116, and outputs a wireless power transmission signal.

Figure 3:
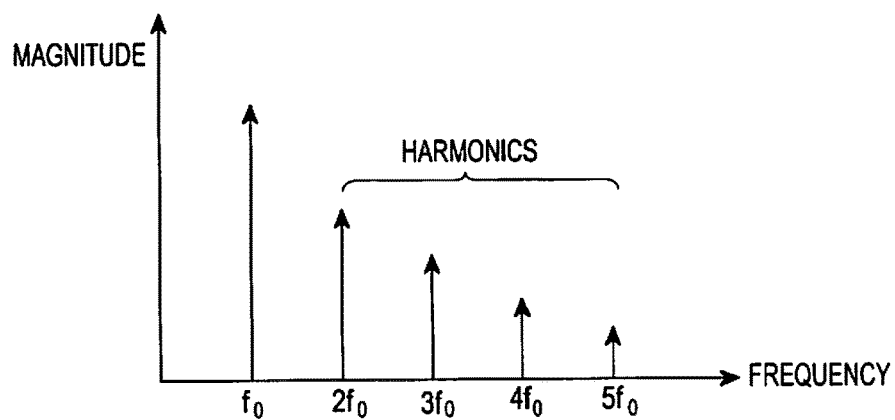
FIG. 3 is a graph illustrating an example of a wireless power transmission signal according to an embodiment of the present invention.

FIG. 3 illustrates an example of a wireless power transmission signal according to an embodiment of the present invention.

Referring to FIG. 3, when the power amplifier 114 corresponds to a non-linear device and amplifies a source power, a signal having a frequency of f0 and harmonics having 2f0, 3f0, 4f0, 5f0, etc., are output as a wireless power transmission signal.

According to an embodiment of the present invention, the wireless power transmission signal output by the power amplifier 114 is provided to the low pass filter 118 for power transmission, and is provided to the band pass filter 122 for communication.

The low pass filter 118 rejects a harmonic wave band from the wireless power transmission signal output by the power amplifier 114, removing the harmonics 2f0, 3f0, 4f0, and 5f0, i.e., harmonic waves, included in the wireless power transmission signal, and pass only a wireless power transmission signal corresponding to a predetermined wireless power transmission frequency band.

Figure 4:
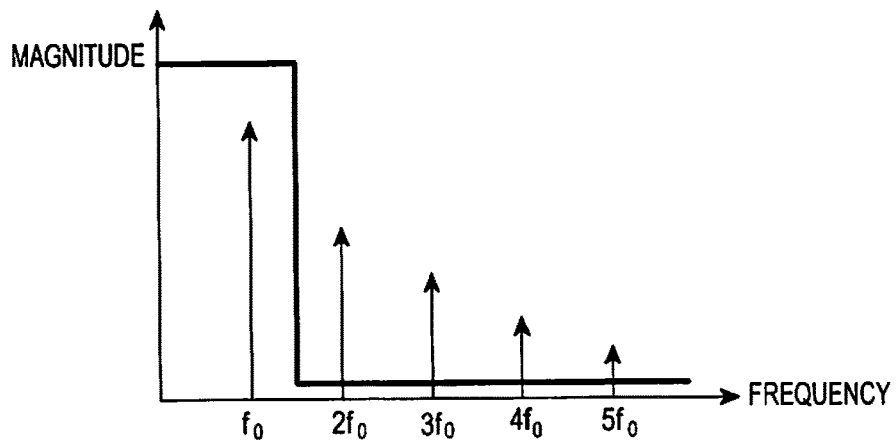
FIG. 4 is a graph illustrating an example of a wireless power transmission signal that is passed by a low pass filter according to an embodiment of the present invention.

FIG. 4 illustrates an example of a wireless power transmission signal that is passed by a low pass filter according to an embodiment of the present invention.

Referring to FIG. 4, the low pass filter 18 rejects a harmonic wave band from the wireless power transmission signal output by the power amplifier 114, as illustrated in FIG. 3, removing the harmonics 2f0, 3f0, 4f0, and 5f0, and passes only a wireless power transmission signal corresponding to a predetermined wireless power transmission frequency band, i.e., a wireless power transmission signal of f0. Accordingly, harmonic waves that are generated during amplification by the power amplifier 114 are blocked from the resonance unit 120.

The resonance unit 120 resonates based on the signal of the power transmission frequency band passed by the low pass filter 118, thereby outputting the wireless power transmission signal.

The band pass filter 122 passes only a harmonic wave corresponding to a predetermined communication frequency from among the harmonic waves included in the wireless power transmission signal output by the power amplifier 114.

Figure 5:
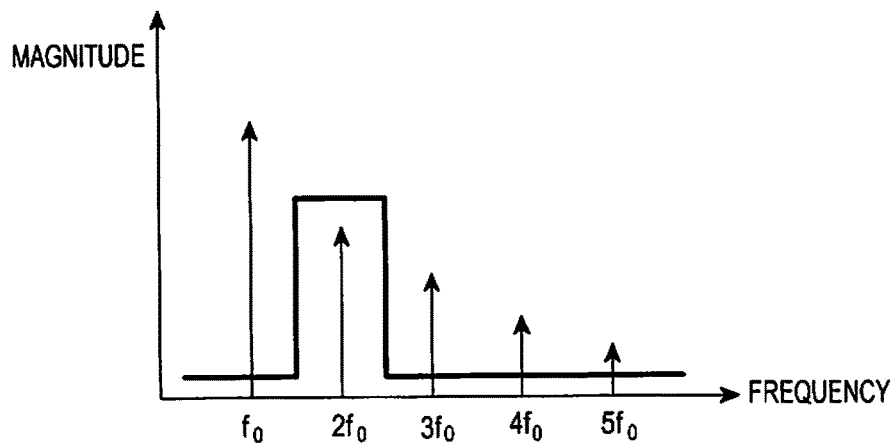
FIG. 5 is a graph illustrating an example of a communication frequency signal that is passed by a band pass filter according to an embodiment of the present invention.

FIG. 5 illustrates an example of a communication frequency signal that is passed by a band pass filter according to an embodiment of the present invention.

Referring to FIG. 5, the band pass filter 122 filters out bands except for a predetermined harmonic wave band, for example, 2f0, from a wireless power transmission signal output by the power amplifier 114, as illustrated in FIG. 3, and passes only the predetermined harmonic wave, i.e., 2f0, so that the harmonic wave 2f0 is used as a communication frequency. Accordingly, a communication frequency is generated using the wireless power signal output by the power amplifier 114, and therefore, a separate component element for generating a communication frequency, such as, an oscillator, is not required.

The communication unit 124 generates a wireless power transmission control signal using a harmonic wave corresponding to a communication frequency that is passed by the band pass filter 122, based on a control by the controller 116, and transmits the wireless power transmission control signal via the ANT.

The controller 116 generally controls the operations of a wireless power transmission controlling apparatus, and controls each component during the above described wireless power transmission. For example, the controller 116 generates various control signals for wireless power transmission, and processes a signal received from a wireless power receiving apparatus.

Additionally, during the wireless power transmission, the controller 116 computes an amount of transmission power to be transmitted through the resonance unit 120, based on information received from the wireless power receiving apparatus, and controls the power amplifier 114 to output a wireless power transmission signal corresponding to the computed amount of transmission power. When the controller 116 requires transmission of a wireless power transmission control signal for wireless power transmission, the controller 116 performs controlling such that a wireless power transmission control signal is to be transmitted through the communication unit 124 based on a harmonic wave of a power supplying signal.

According to an embodiment of the present invention, the wireless power transmission control signal includes a control signal for wireless power transmission, such as starting the wireless power transmission, stopping the wireless power transmission, power transmission frequency information, etc.

Figure 6:
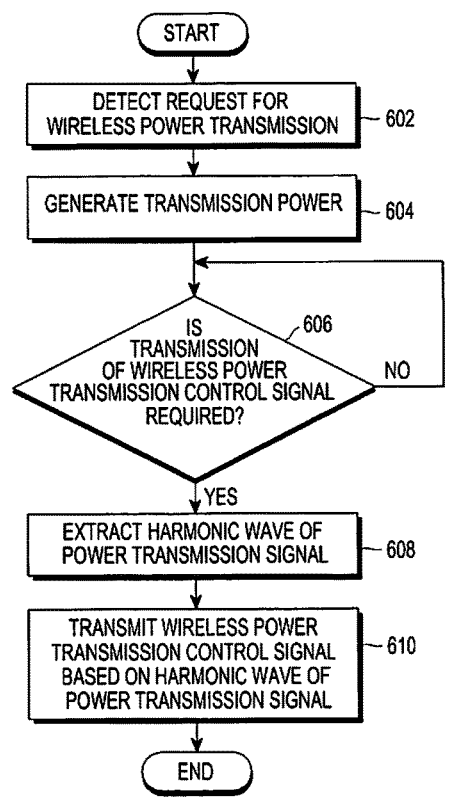
FIG. 6 is a flowchart illustrating a wireless power transmission controlling method according to an embodiment of the present invention.

FIG. 6 is a flowchart illustrating a wireless power transmission controlling method according to an embodiment of the present invention.

Referring to FIG. 6, in step 602, a wireless power transmission controlling apparatus detects a request for wireless power transmission. For example, through the communication unit 124, the wireless power transmission controlling apparatus detects a request for the wireless power transmission by receiving a wireless power transmission request signal from a wireless power receiving apparatus, or based on a change in a resonant frequency or a change in a load occurring when an object is placed in contact with the resonance unit 120.

In step 604, the wireless power transmission controlling apparatus generates a wireless power transmission signal. For example, the wireless power transmission controlling apparatus computes an amount of transmission power to be transmitted through the resonance unit 120, and amplifies a source power through the power amplifier 114, thereby generating a wireless power transmission signal corresponding to the amount of transmission power.

In step 606, the wireless power transmission controlling apparatus determines whether transmission of a wireless power transmission control signal is required. For example, through the controller 116, the wireless power transmission controlling apparatus determines that the transmission of the wireless power transmission control signal is required when the controller 116 should start the wireless power transmission, stop the wireless power transmission, transmit power transmission frequency information, etc.

When the transmission of the wireless power transmission control signal is required, in step 608, the wireless power transmission controlling apparatus extracts a harmonic wave corresponding to a predetermined communication frequency from the wireless power transmission signal output by the power amplifier 114, through use of the band pass filter 122.

In step 610, the wireless power transmission controlling apparatus transmits the wireless power transmission control signal based on the extracted harmonic wave of the wireless power transmission signal, through the communication unit 124.

According to the above-described embodiments of the present invention, when different frequencies are used for a power supplying frequency band and a communication frequency band between a power supplying apparatus and a power receiving apparatus, the requirement of a separate circuit for generating a communication frequency is eliminated, by using a harmonic wave generated from a power supplying signal as the communication frequency for controlling power transmission Accordingly, by generating a communication frequency for controlling power transmission, without using a separate circuit, a circuit of the wireless power transmission controlling apparatus may be simply configured and the cost for embodying the same is reduced.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. An apparatus for controlling wireless power transmission, the apparatus comprising:
    a communication unit;
    a resonance unit; and
    a controller configured to:
        compute an amount of transmission power to be transmitted, based on information received from a wireless power receiving apparatus;
        output a wireless power transmission signal corresponding to the computed amount of transmission power;
        filter the wireless power transmission signal, and pass a wireless power transmission frequency corresponding to a predetermined wireless power transmission frequency band;
        filter the wireless power transmission signal and pass a harmonic wave corresponding to a predetermined communication frequency band;
        control the resonance unit to transmit the wireless transmission power based on the wireless power transmission frequency; and
        control the communication unit to transmit a wireless power transmission control signal based on the harmonic wave.

2. The apparatus of claim 1, wherein the communication unit performs near field communication (NFC).

3. The apparatus of claim 1, wherein the predetermined communication frequency band and the predetermined wireless power transmission frequency band are different frequency bands.

4. The apparatus of claim 1, wherein the predetermined wireless power transmission frequency band is 6.78 MHz.

5. The apparatus of claim 1, wherein the predetermined communication frequency band is 13.56 megahertz (MHz).

6. The apparatus of claim 1, further comprising:
    a power unit configured to supply a source power;
    a power amplifier configured to amplify the source power based on the computed amount of transmission power and the wireless power transmission signal;
    a low pass filter configured to filter the wireless power transmission signal, and pass the wireless power transmission frequency; and
    a band pass filter configured to filter the wireless power transmission signal, and pass the harmonic wave.

7. A method of controlling wireless power transmission by a power supplying apparatus, the method comprising:
    computing an amount of transmission power to be transmitted, based on information received from a wireless power receiving apparatus;
    outputting a wireless power transmission signal corresponding to the computed amount of transmission power;
    filtering the wireless power transmission signal, and passing a wireless power transmission frequency corresponding to a predetermined wireless power transmission frequency band;
    filtering the wireless power transmission signal and passing a harmonic wave corresponding to a predetermined communication frequency band;
    transmitting, through a resonance unit, the wireless transmission power based on the wireless power transmission frequency; and
    transmitting, through a communication unit, a wireless power transmission control signal based on the harmonic wave.

8. The method of claim 7, wherein passing the harmonic wave corresponding to the predetermined communication frequency band comprises passing the harmonic wave corresponding to the predetermined communication frequency band from among the wireless power transmission frequency and a plurality of harmonics included in the wireless power transmission signal, in response to a request for transmitting the wireless power transmission control signal.

9. The method of claim 7, wherein the predetermined communication frequency band and the predetermined wireless power transmission frequency band are different band frequency bands.

10. The method of claim 7, wherein the predetermined wireless power transmission frequency band is 6.78 MHz.

11. The method of claim 7, wherein the predetermined communication frequency band is 13.56 megahertz (MHz).

12. The method of claim 7, wherein passing the wireless power transmission frequency corresponding to the predetermined wireless power transmission frequency band comprises passing the wireless power transmission frequency corresponding to the predetermined wireless power transmission frequency band from among the wireless power transmission frequency and a plurality of harmonics included in the wireless power transmission signal, in response to a request for transmission of the transmission power.

* * * * *